United States Patent [19]

Tesch

[11] Patent Number: 4,712,720
[45] Date of Patent: Dec. 15, 1987

[54] DEVICE FOR MUTUALLY CENTERING AND CLAMPING TWO PIPE BODIES TO BE WELDED TO ONE ANOTHER

[76] Inventor: Klaus Tesch, Dorotheenstrasse 93, 2000 Hamburg 60, Fed. Rep. of Germany

[21] Appl. No.: 937,064
[22] PCT Filed: Mar. 11, 1986
[86] PCT No.: PCT/EP86/00131
    § 371 Date: Nov. 14, 1986
    § 102(e) Date: Nov. 14, 1986
[87] PCT Pub. No.: WO86/05430
    PCT Pub. Date: Sep. 25, 1986

[30] Foreign Application Priority Data

Mar. 14, 1985 [DE] Fed. Rep. of Germany ....... 8507555
Sep. 11, 1985 [DE] Fed. Rep. of Germany ....... 8525952

[51] Int. Cl.[4] .............................................. B23K 31/06
[52] U.S. Cl. .................................. 228/49.3; 228/219; 269/48.1; 279/2 R
[58] Field of Search ................... 228/219, 220, 49.3, 228/46, 48, 50; 269/48.1; 279/2 R, 2 A

[56] References Cited

U.S. PATENT DOCUMENTS

| | | | |
|---|---|---|---|
| 2,226,078 | 12/1940 | Spahn | 269/48.1 |
| 2,546,950 | 3/1951 | Nixon | 279/2 |
| 3,026,115 | 3/1962 | Brauer et al. | 279/2 |
| 3,095,844 | 7/1963 | Thielsch | 228/219 |
| 3,498,518 | 3/1970 | Wheeler et al. | 228/50 |
| 3,900,913 | 8/1975 | Drumm | 279/2 |
| 4,387,845 | 6/1983 | Mefferd | 228/222 |
| 4,413,655 | 11/1983 | Brown | 228/219 |
| 4,415,114 | 11/1983 | Hallenbeck | 228/219 |

FOREIGN PATENT DOCUMENTS

| | | |
|---|---|---|
| 2522465 | 12/1976 | Fed. Rep. of Germany . |
| 2708040 | 4/1979 | Fed. Rep. of Germany . |
| 3233796 | 4/1984 | Fed. Rep. of Germany . |
| 2443008 | 6/1980 | France . |
| 2509211 | 1/1983 | France . |

Primary Examiner—M. Jordan
Attorney, Agent, or Firm—Handal & Morofsky

[57] ABSTRACT

Device for mutually centering and clamping two pipe-pieces which are to be welded to one another, which device, for each of the workpieces (50, 51), has a clamping unit on both sides of a welding area (9) provided with an inert gas supply (27). Each clamping unit comprises at least one peripheral row of clamping members which are contained in each case in a clamping groove (36, 39, 42), can be stretched outwards or relaxed inwards by mutual axial approach or distancing of the flanks of the clamping groove and have an outwardly pointing clamping surface for the contact with the bore surface of the workpiece. For achieving an easy method of construction and application, it is provided that the axial extent of the clamping members, lined up in large number at a slight distance, is greater than the width of their clamping surfaces in the peripheral direction. They are preferably formed by the coils of a helical spring (3).

16 Claims, 6 Drawing Figures

Fig. 2

DEVICE FOR MUTUALLY CENTERING AND CLAMPING TWO PIPE BODIES TO BE WELDED TO ONE ANOTHER

DESCRIPTION OF THE INVENTION

The invention relates to a device for mutually centering and clamping two workpieces which are to be welded to one another and have a round bore, which device, for each of the workpieces, has a clamping unit on both sides of a welding area provided with an inert gas supply, which clamping unit has at least one peripheral row of clamping members which are contained in a clamping groove, can be stretched outwards or relaxed inwards radially by mutual axial approach or distancing of the flanks of the clamping groove and have an outwardly pointing clamping surface for the contact with the bore surface of the workpiece and are also at a distance from one another in the peripheral direction.

In a known device of this type (DE-A No. 2,708,040), each of the clamping grooves contains a plurality of specially formed clamping wedges which in turn support a clamping shoe on their outer surface facing towards the pipe periphery, which clamping shoe can come in contact over a large area with the pipe inner surface to be clamped The clamping wedges are held inside the clamping grooves by means of a number of tension springs running in the peripheral direction. The clamping grooves are formed on the one hand by a firmly arranged groove wall and on the other hand by a hydraulic piston which, for tightening the clamping wedges by charging with a pressure medium, can be axially displaced relative to the groove wall. Although the known clamping device is intended for a laser welding process and the clamping shoes are therefore comparatively safe from damage with regard to their stressing caused by the clamping forces and the thermal loading, the clamping wedges and clamping shoes of the known device are of a fairly coarse embodiment. Although this has the disadvantage that the entire construction turns out to be relatively heavy, it is also partly considered advantageous because it facilitates the heat dissipation ("Automation" 1977, p 59), with it also being possible for this purpose to provide the clamping shoes with special cooling channels (U.S. Pat. No. 4,387,845). A further disadvantage of the embodiment of the clamping shoes as large parts is that they make it difficult to evacuate completely the atmospheric air by the inert gas supplied to the welding area. In the known devices, the intention is to achieve such an accurately centered guidance of the clamping members that the latter can cylindrically orientate a deformed pipe surface. However, the smaller the number of clamping members, the more limited are the possibilities of an accurately centered movement guidance.

The object of the invention is to create a clamping device of the type mentioned at the beginning which is of simple construction and can be variably and reliably applied, with the intention being to ensure adequate cooling and, at moderate inert gas consumption, reliable oxygen displacement.

The solution according to the invention is that the axial extent of the clamping members, lined up in large number at a slight mutual distance, is greater than the width of their clamping surfaces in the peripheral direction.

As a departure from the previous design principles, the individual clamping members are not made as large parts in small number but conversely as small parts in large number. Since they only extend slightly in the peripheral direction and in particular since their contact surface with the pipe inner surface is small in the peripheral direction, the disturbing influences which are brought to bear on them on the one hand from the welding area and on the other hand as thermal stress from the pipe inner surface ae also kept small in comparison with the cooling effect of the inert gas, which cooling effect is therefore very intensive, because the axial extent of the clamping members is comparatively large and therefore a large cooling surface is made available. During the displacement of the atmospheric oxygen by the inert gas, the small clamping members do not act as barriers but in their plurality, in combination with the small cross-sections of passage located between them, rather as a uniform choke resistance which aids the uniform oxygen displacement, with, as a result of the small extent of the clamping members, pockets being prevented from forming in which atmospheric oxygen residues could be retained, and barriers being avoided which could impede the flushing operation. At the same time, as a result of the inert gas throughput, not only are the clamping members uniformly cooled but so too is the pipe inner surface. The small extent of the clamping members in the peripheral direction also enables them to be of small configuration in the radial direction, so that the surface of the retaining body supporting them approaches very close to the pipe inner surface, which favorably influences the cooling effect.

It is expedient for the clamping surfaces of the clamping members to be essentially punctiform, which can be achieved by an arched outer surface of the latter. This reduces the heat transfer from the pipe inner surface to the clamping members and thus the risk of the latter overheating. In a particularly advantageous embodiment of the invention, the row of clamping members is formed by a spring having a plurality of disks or coils in each case arranged approximately in the longitudinal direction. A simple helical spring is primarily suitable for this purpose, although a meander spring or the like may also be suitable. A helical spring has proved to be particularly advantageous because it is a very simple and inexpensive component which has clearly defined guide and clamping surfaces in interaction both with the guide surfaces of the clamping groove and with the pipe inner surface. It can be easily assembled and replaced by simpy being slipped off from outside over the retaining body. Its punctiform contact surface with the pipe inner surface protects it from overheating, with it presenting at the same time a large cooling area to the inert gas. At a small coil spacing, each cross-section of passage acts as a flow resistance, as a result of which a choked and nevertheless completely uniform throughput of inert gas is achieved over the entire periphery. Trouble caused by adherng particles seldom occurs, because they can easily be pushed away on account of the smallness of the clamping surfaces interacting with the pipe inner surface and the resilience of the spring coils when in the clamped position. The large number of clamping members formed by the coils statistically acts completely uniformly, so that even deformed pipe cross-sections can be rounded off to an exceptional extent.

A great advantage of the invention is also that the springs can be easily replaced, namely even in the place of use. This applies not only in the event of damage but also enables springs of different coil diameters to be used for compensating diametrical tolerances of the workpieces. Thus, for example, the diameter range for which a particular device is suitable can be expanded by using thicker springs. A spring change can also be desired if the material of the workpieces is to come in contact only with a certain spring material.

However, other embodiments of the clamping members are also suitable, for example in the form of disks which are lined up on a spring line without a space or only at a slight distance from one another. Balls which are essentially lined up without a space from one another can also be used, although, on account of their shape, they reveal relatively large cross-sections of passage between them which are often undesirable. The use of balls as clamping members is known per se (DE-C No. 3,233,796), though only in relatively small number with large intermediate spaces over the periphery.

It can generally be said of the width of the intermediate spaces that they are to be so small that a choke effect for the inert gas is achieved together with a pressure drop which makes the admission of atmospheric oxygen more difficult, with on the other hand the intention being for the cross-sections of passage te be distributed as uniformly as possible over the entire periphery. The width of the intermediate spaces is generally to be smaller than the peripheral width of the clamping members. When a helical spring is used, its coils can expediently lie virtually against one another on the inside.

According to a further feature of the invention, the groove wall which faces towards the welding area can be made such that it projects radially to such an extent that the clamping members are largely screened from it. For this purpose, it has an outside diameter which is only a few per cent less than the clearance diameter of the workpiece bore.

At least one of the two clamping units expediently has two clamping members rows at an axial distance from one another in order to not only center but also axially orientate the pipe part to be clamped.

The design becomes especially simple if the clamping grooves are formed by rings which, partly displaceable and connected by bushings, sit on a retaining body which at the same time can also form the groove root of the clamping grooves. Groove walls belonging to the same clamping unit can be displaceable from the retaining body for common actuation. On the other hand, groove walls belonging to different clamping units can be firmly arranged on the retaining body, with the latter being expediently arranged in the path of the drive force so that only one drive movement is required for driving both clamping units. According to a further feature of the invention, both clamping units, despite the presence of only one drive, can be actuated separately from one another. This is achieved in that all clamping grooves of the two clamping units are connected one after the other with respect to the drive, and a spring which counteracts the drive force is provided parallel to the clamping grooves of one of the clamping units. This spring ensures that on initial actuation of the drive, the clamping unit allocated to it remains relieved temporarily of the drive force, so that only the other clamping unit is stretched. This enables the two clamping units to be brought gradually into effect one after the other by slowly applying the drive so as to be able first of all to clamp at leisure one of the two workpieces to be clamped and only later to clamp the other. If a drive charged with a pressure medium is used, a switch can be provided which enables the drive to be charged with a mean effective pressure, the size of which, although adequate for stretching one clamping unit, is not adequate for overcoming the spring allocated to the other clamping unit, so that in this way the clamping device can be adjusted such that merely one of its two clamping facilities is activated.

For the purpose of better cooling, a coolant circuit can be provided for the retaining body Since the same pressure-medium drive is used for both clamping units and therefore the pressure-medium consumption is comparatively low, inert gas can be used according to the invention as a pressure medium for the drive, which has the advantage that, in the event of the drive cylinder leaking, no damage can occur as a result of extraneous pressure medium flowing to the weld location, and that the arrangement becomes lighter and simpler by saving on a further medium supply.

BRIEF DESCRIPTION OF THE DRAWINGS

The invention is described in greater detail below with reference to the drawing, which illustrates advantageous exemplary embodiments and in which:

FIGS. 1 to 3 show longitudinal sections through three different embodiments of the device.

DETAILED DESCRIPTION OF THE INVENTION

Figure 1:
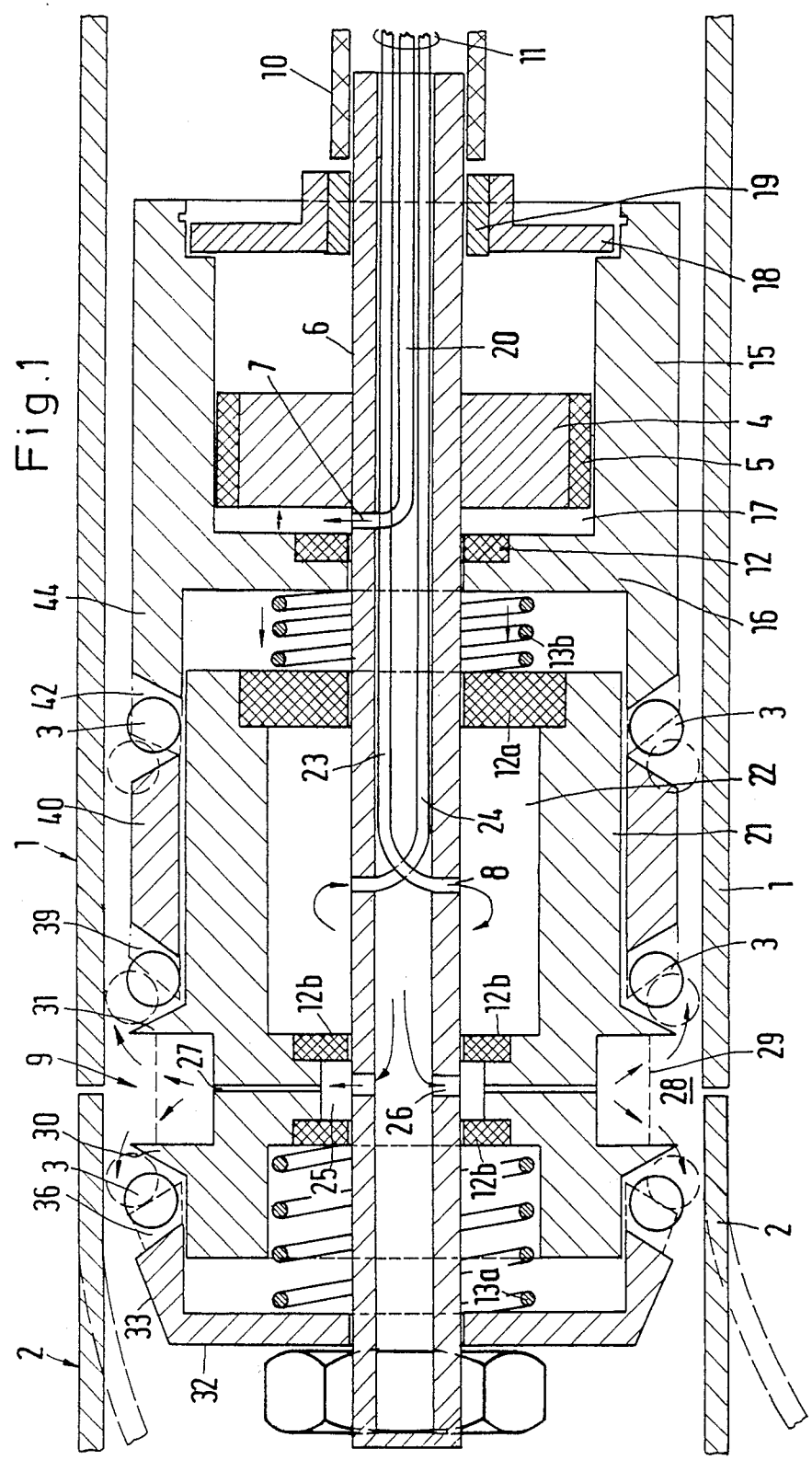

The clamping device shown in FIG. 1 is used for clamping the pipe ends 1 and 2 firmly and in exact alignment with one another in the area of their joint, so that they can be welded to one another without problems from the outside by means of an automatic circumferential-welding machine. An important field of application is, for example, the manufacture of pneumatic dispatch lines in which very high requirements are called for in the alignment accuracy of the pipe walls in order to avoid troublesome shoulders or steps.

A piston 4 is firmly arranged on the piston rod 6, which piston 4, within a cylinder 15, with the end wall 16 of the latter, encloses a cylinder space 17. At the periphery, the piston 4 is sealed relative to the cylinder 15 by means of a seal 5. The cylinder wall 16, relative to the piston rod 6 displaceable therein, is sealed by means of a seal 12. The other end of the cylinder 15 is closed by a disk 18 which contains a guide boss 19 for the piston rod 6.

The piston rod is tubular and is made closed at the left-hand end and open at the right-hand end. A line 20 is guided through its hollow space to an opening 7 which in the drawing is located in the piston rod directly to the left of the piston 7 and through which the working space 17 can be charged with a pressure medium for actuating the clamping device.

In the drawing, the retaining body 21 is arranged to the left of the piston-cylinder device, which retaining body 21 is essentially made as a hollow cylinder which is axially displaceable and mounted coaxially on the piston rod 6 at its right-hand end by means of a sealing and guide bushing 12a and at a distance therefrom by means of a pair of guide and sealing bushings 12b.

Within the retaining body, the sealing bushings 12a and 12b enclose a coolant space 22 which can be flushed with a coolant, for example water, via a coolant supply line 23 and a coolant discharge line 24 which are laid inside the hollow space of the piston rod 6.

The pair of sealing and guide bushings 12b encloses an annular space 25 which is permanently connected to the hollow space of the piston rod 6 via one or more bores 26. In addition, several bores 27 lead radially outwards from the annular space 25 to an annular space 28 which is formed in the outer periphery of the retaining body and which can contain a perforated plate 29, running all around, for the purpose of evening out the afflux. If the piston rod hollow space is charged with inert gas, inert as can be supplied to the welding area 9 through the bores 26 and 27.

On both sides of the annular space 28, two annular projections 30 and 31 rise on the cylinder surface of the retaining body and form conical flanks on their side facing away from the annular space. In each case a cylindrical section adjoins the conical flanks.

A plate 32 having a collar 33 sits firmly on the left-hand end of the piston rod 6, which plate 32 grips in matching manner over the left-hand cylindrical section of the retaining body 21 and forms a conical flank which is located opposite the conical flank of the annular projection 30 and is inclined in the opposite direction. The two flanks enclose a clamping groove 36 for accommodating a helical spring 3 which is closed in an annular shape and which has a certain pretension so that it always moves into the position of minimum peripheral length. The coils of this spring form the clamping members and virtually lie against one another.

On the other side of the annular space 28, a bushing 40 is displaceably arranged on the cylindrical section of the retaining body, which bushing 40 is defined at both end faces by conical flanks. The conical flank shown on the left-hand side in the drawing encloses, with the flank of the annular projection 31, a clamping groove 39 which has a helical spring 3 and is identical to the clamping groove 36. The other flank helps to form a clamping groove 42 for a helical spring 3 which is restricted on the other side by a conical flank which is arranged on a hollow-cylindrical extension 44 of the cylinder 15 which grips over the outer periphery of the retaining body 21.

Axially acting compression springs 13a and 13b respectively are arranged as centering springs between the retaining body 21 and the plate 32 on the one hand and the retaining body 21 and the flange 16 of the cylinder 15 on the other hand, with the spring 13a developing a greater compressive force than the spring 13b.

A flexible tube 10 is firmly and tightly connected to the right-hand open end of the piston rod 6, which flexible tube 10 is used for the supply of the inert gas and contains a group 11 of lines, namely the coolant lines 23 and 24 and also, in the case of a separate supply of the pressure medium, the line 20 for the latter.

The clamping groove 36, together with the associated parts, forms a clamping unit for the pipe piece or bend 2, whereas the clamping grooves 39 and 42 belong to the clamping unit allocated to the pipe piece 1.

The device is used in the following manner. In the relieved condition of the device, the springs 3 lie inside the clamping grooves accommodating them. Their outside diameter is smaller than the inside diameter of the pipe pieces 1 and 2. The device can therefore be brought to the provided location so that the weld location lies in front of the annular space 28.

When the working space 17 of the piston-cylinder device 4, 15 is charged with a pressure medium, the piston rod 6 is moved to the right relative to the cylinder 15, as a result of which the spring 13b is compressed from the left-hand end of the piston rod via the plate 32, the spring 13a and the retaining body 21, while the retaining body 21 approaches the cylinder 15. At the same time, the clamping grooves 39 and 42 become narrower, as a result of which the springs held in them are pressed outwards in the manner indicated in broken lines until they come to bear against the inner periphery of the pipe 1 and thereby at least temporarily center and secure the clamping device inside this pipe. During this, care is taken to ensure that the end edge of the pipe piece 1, which end edge is to be welded, comes to lie centrally in front of the annular space 28. The strength of the spring 13a is selected such that, in this condition, the clamping unit formed in the area of the groove 36 does not yet start to function, so that the pipe 2 can still be adjusted. The pressure in the working space 17 is then increased so that the spring 13a can also be compressed and the clamping groove 36 of the left-hand clamping unit is narrowed and the helical spring 3 located therein is pressed outwards into the position indicated in broken lines until the pipe 2 is also centered and clamped. At the same time, the spring, as follows from its different position, as shown in solid and broken lines, also executes an axial movement which can be used for clamping the abutting faces of the pipes against one another.

As soon as the clamping device is located in the ready clamped condition, inert gas is supplied which displaces the atmospheric air out of the annular space 28 and therefore out of the welding area 9. The arrangement is now ready for the automatic welding of the pipe joint from outside. In order to avoid overheating of the device, the retaining part 21 can at the same time be cooled by the supply of coolant to the coolant space 22.

Figure 2:
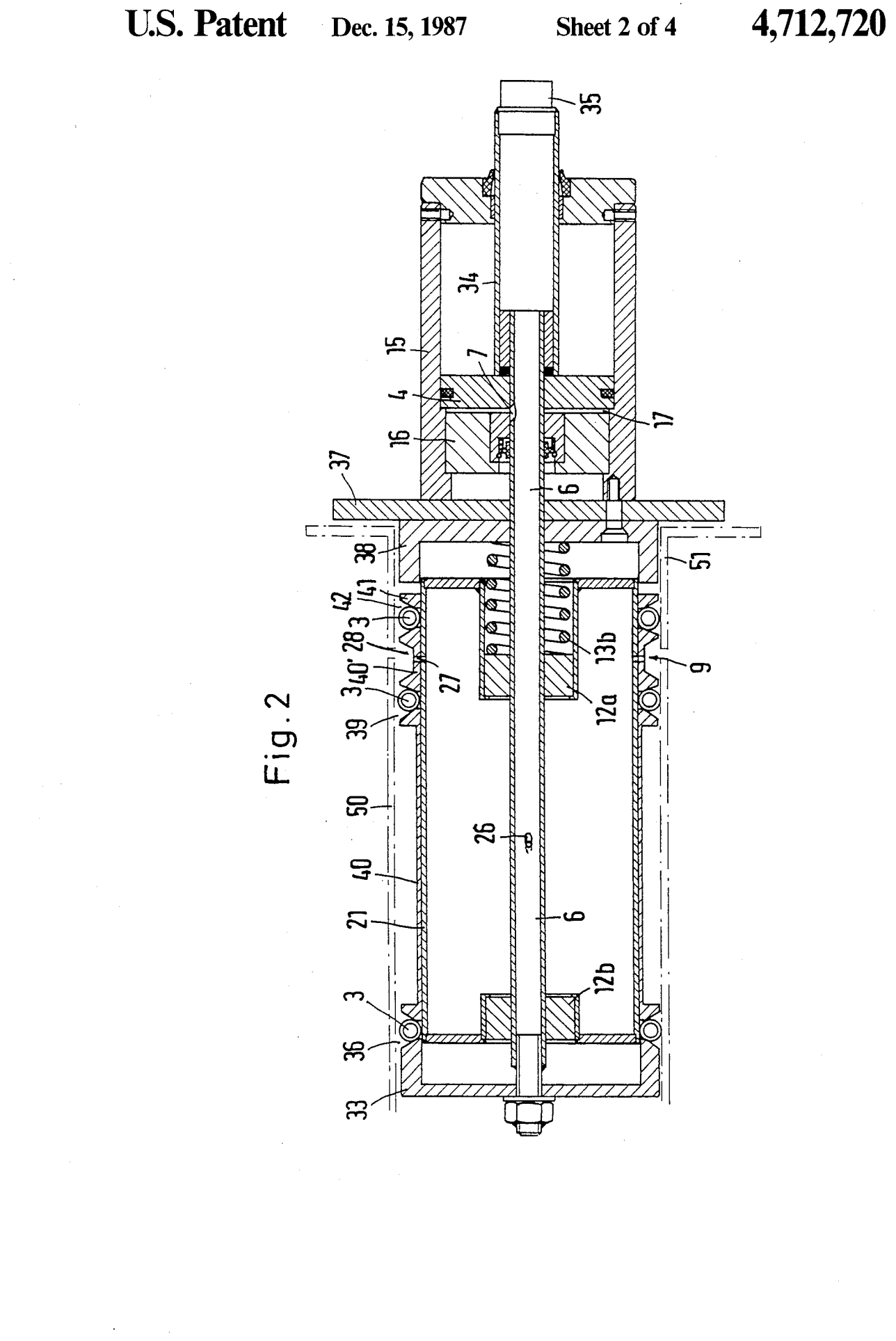

FIG. 2 shows a clamping device for clamping a pipe piece 50 to a flange 51. Such parts which are identical to the parts described with reference to FIG. 1 have the same reference numerals.

Inside the pneumatic cylinder 15, a working space 17 is formed between a piston 4 and a fixed cylinder wall 16. On the right-hand side in the drawing, the piston is firmly connected to a pipe 34 which, at the end, has a connector socket 35 for the connection of a pressure-gas hose, with the supply of the pressure gas being controllable by means of a device not shown. Moreover, the piston rod 6 is firmly connected to the piston 4, which piston rod 6 mainly extends on the left-hand side, as seen in the drawing, of the piston 4 and is connected to the inner space of the pipe 34 and at 7 has a lateral opening into the working space 17 for the supply of pressure gas for the purpose of actuating the clamping device.

The cylinder 15 is firmly connected to a plate 37 which is designated below as a stop plate, because it forms a stop for the positioning of the flange part 51 to be welded. It has a cylindrical collar 38 on its side facing away from the cylinder 15. The piston rod 6 is guided coaxially and movably in the longitudinal direction through the stop plate 37 and the collar 38. At its end, it is firmly connected to a plate 32 which has a collar 33. A cylindrical retaining body 21 is arranged between the two collars 33 and 38, which retaining body 21 can be guided in the bores of these collars. In addition or instead, it can also be guided in longitudinally movable manner on the piston rod 6 by means of sealing and guide bushings 12a and 12b in the bosses of its end walls. It is supported on the base of the collar 38 by a spring 13b.

A cylindrical sleeve 40 is guided on the retaining body 21, the enlarged end faces of which sleeve 40 form conical flanks. The end flank of the collar 33 is also correspondingly conical, which end flank is opposite the conical flank of the sleeve 40 and encloses with the latter a clamping groove 36 in which a helical spring 3 is arranged which is closed in an annular shape and the individual coils of which form the clamping members.

Whereas the sleeve 40 is movable in the longitudinal direction on the retaining body 21, the sleeve 40' likewise arranged on the bearer is firmly connected to the latter in the axial direction. The sleeve 40' also forms on its enlarged ends annular projections 30 and 31 having conical flanks, of which one is opposite the flank of the sleeve 40 and encloses with the latter a clamping groove 39 for a helical spring 3, whereas the other is opposite a correspondingly conically formed flank of an axially movable ring 41 arranged on the periphery of the retaining body 21 and forms with this ring 41 a clamping groove 42 for a helical spring 3. In the relieved condition of the arrangement, which condition is shown in the figure, the ring 41 has clearance relative to the end face of the collar 38.

A bore 27 is provided in the retaining body 21 and the sleeve 40' between the annular projections 30 and 31. Moreover, a bore 26 is made in the piston rod 6 in the area of the retaining body 21. The inert gas which otherwise is also used as a pressure medium for the cylinder space 17 can flow through these bores into the welding area 9 of the pipe pieces 50 and 51 to be clamped.

The clamping grooves 36 and 39, together with the associated parts, form a clamping unit for the pipe piece 50, whereas the clamping groove 42, together with the parts belonging to it, forms a second clamping unit for the flange part 51.

The device works as follows:

In the relieved condition shown, the pipe pieces 50 and 51 can be attached onto the clamping device in the manner shown. If an inert gas is now supplied at an initial mean effective pressure of, for example, 5 bar via the connection 35, the piston rod 6 moves to the right in the drawing, with pressure forces being transmitted to the spring 13b by the collar 33 via the clamping groove 36, the helical spring 3, the sleeve 40, the clamping groove 39 and the helical spring 3 contained therein, the sleeve 40', the retaining body 21 and the bushing 12a, which spring 13b is of such a size that at this moderate pressure it behaves practically rigidly or at any rate cannot be compressed any further than corresponds to the size of the clearance between the parts 38 and 40. This means that, up to this pressure limit, merely the helical springs in the clamping grooves 36 and 39 are pressed outwards by the conical flanks of the latter in order to orientate and clamp the pipe piece 50. Care can therefore be taken at leisure to ensure that the end face of this pipe piece, which end face is to be welded, is located exactly in the center of the welding area enclosed by the annular projections 30 and 31. The pressure is then allowed to rise further so that the spring 14 (sic) is compressed. An axial relative movement then takes place between the stop plate 37 and the pipe piece 50 clamped in the meantime in the sense that the flange 51 is pushed against the pipe piece 50. As soon as the clearance next to the ring 41 has been overcome, the ring 41 is acted upon by the collar 38, and the helical spring 3 in the clamping groove 42 is pressed outwards, as a result of which the flange 51 is centered and clamped.

At the end of this operation, the pipe pieces 50 and 51 are centered and their end faces bear against one another under clamping action, with inert gas flushing them.

It can be recognized that this device is of exceptionally simple construction and with the simplest control means can be operated as a welding clamping device merely with inert gas as the control medium. Moreover, the helical springs 3 adjacent to the welding area 9 are screened from the welding area by the annular projections 30 and 31 and are well cooled by largely being incorporated into cool parts of the clamping device and also by uniform pressure flow of the inert has, whereas the heat from the worked pipe pieces 50 and 51 is only conducted to them slowly as a result of the contact faces reduced in punctiform manner.

Figure 3:
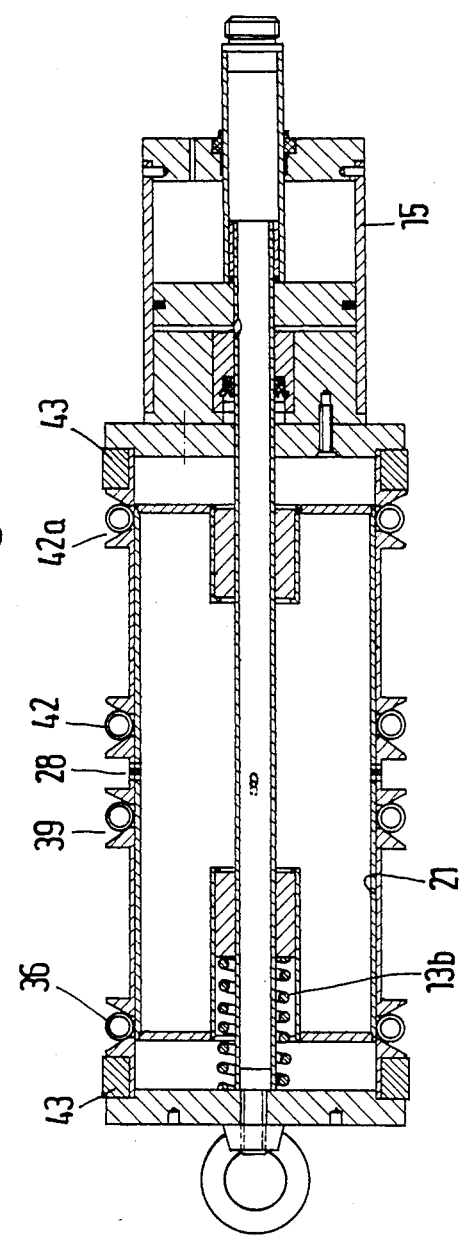

The device according to FIG. 3 is identical to that according to FIG. 2, with the difference that, instead of only one clamping groove 42, which was provided there for the flange 51, an arrangement of two clamping grooves 42 and 42a appears, between which a sleeve is arranged which is displaceable on the retaining body 21, so that the right-hand pipe part is not only centered but is also orientated flush. In addition, the stop plate 37 is dispensed with. Instead, two sliding rings 43 are provided which are made of a plastic of low coefficient of friction and project radially outwards slightly further than the annular projections forming the clamping grooves. These sliding rings facilitate the displacement of the clamping device inside a closed pipeline.

The spring 13b is arranged on the side of the retaining body 21, which side faces away from the cylinder 15. This results in the clamping unit which is more remote from the cylinder 15, to which clamping unit the clamping grooves 36 and 39 belong, being clamped later than the clampng unit which is nearer to the cylinder 15 and has the clamping grooves 42 and 42a. Of course, this device is only suitable for clamping pipe pieces which extend rectilinearly. If pipe bends are also found on one side of the welding location, the clamping unit appearing on the left-hand side in FIG. 3 ought to be made shortened with only one clamping groove, as shown in FIG. 1.

Figure 4:
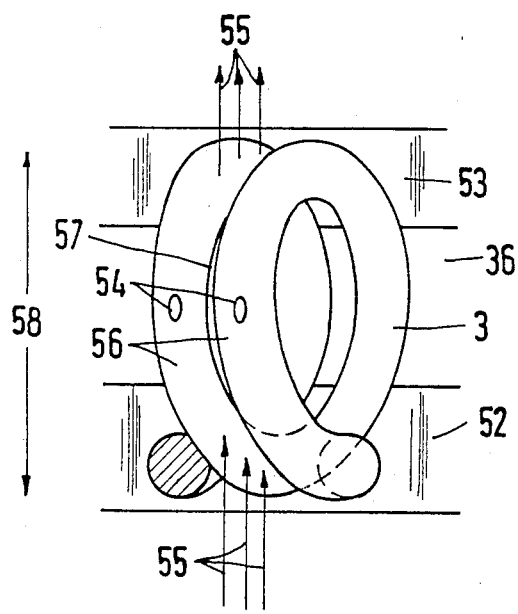
FIG. 4 shows a perspective, enlarged view, as seen radially from the outside towards a clamping groove and the spring contained therein.
Figure 5:
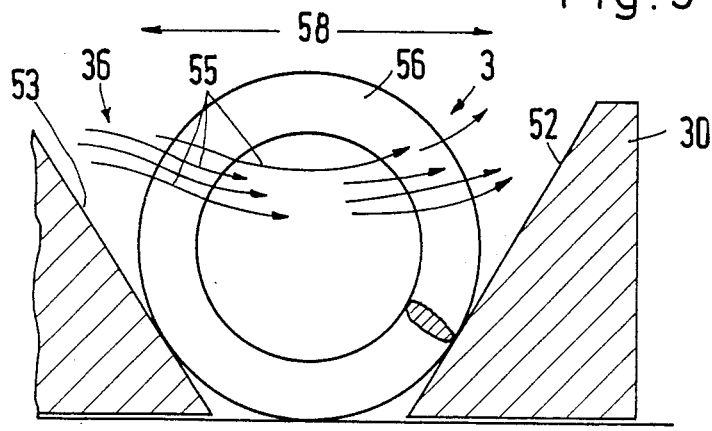
FIG. 5 shows a section, as viewed in the peripheral direction, through the arrangement according to FIG. 4.

In a direction of view directed obliquely and radially from the outside inwards, and also in the peripheral direction, FIGS. 4 and 5 illustrate two coils 56 of a helical spring 3 which are held between the conical flanks 52 and 53 of a clamping groove 36 and each represent a clamping member. Since they are bent from wires which are round in cross-section, they have a curved outwardly pointing surface which merely makes point contact with the bore surface of the workpieces to be clamped, as indicated in the drawing by very small clamping surfaces 54. The overall dimensions of these clamping surfaces are substantially smaller than the axial extent 58 of the individual coils, so that the inert gas flow 55 passing between them through the very small intermediate space 57 finds a cooling surface at the individual coils which is many times larger than the size of the clamping surfaces 54. The coils of the helical spring are thereby effectively cooled; there is no risk of overheating.

Figure 6:
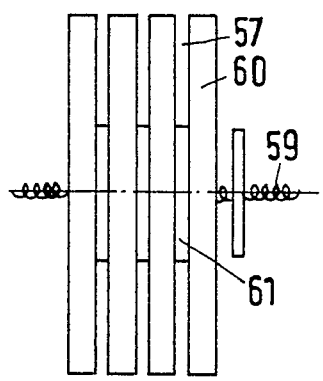
FIG. 6 shows the side view of a row of disk-shaped clamping members.

FIG. 6 illustrates that a similarly effective clamping member arrangement can be achieved by using a plurality of disks 60 which are defined in a circular shape, are held at a distance 57 by intermediate disks 61 and are drawn onto a spring line 59.

I claim:

1. A device for mutually centering and clamping two workpieces (1,2; 50,51) which are to be welded to one another and contain a round bore, which device, for each of the workpieces, has a clamping unit on both sides of a welding area (9) provided with an inert gas supply, which clamping unit comprises at least one peripheral row of clamping members (3) which are contained in a clamping groove (36, 39, 42), can be stretched outwards or relaxed inwards by mutual axial approach or distancing of the flanks (52, 53) of the clamping groove and have an outwardly pointing clamping surface (54) for the contact with the bore surface of the workpiece and are also at a distance (57) from one another in the peripheral direction, wherein the axial extent (58) of the clamping members (56), lined up in large number at a slight distance (57) from one another, is greater than the width of their clamping surfaces (54) in the peripheral direction.

2. The device as claimed in claim 1, wherein the clamping surfaces (54) are essentially punctiform.

3. The device as claimed in claim 1, wherein the row of clamping members is formed by a spring (3) having a plurality of disks or coils (56) in each case arranged approximately in the longitudinal direction.

4. The device as claimed in claim 3, wherein the row of clamping members is formed by a helical spring (3).

5. The device as claimed in claim 1, wherein the row of clamping members is formed by disks (60) lined up at a slight distance from one another on a spring line (59).

6. The device as claimed in claim 1, wherein the width of the intermediate spaces (57), in the peripheral direction, is smaller than the width of the clamping members (56, 60).

7. The device as claimed in claim 1, wherein an encircling recess (28) containing the inert gas supply (27) is provided for the welding area (9), and the clamping members (56, 60) are largely screened from the recess (28) by a groove wall (30, 31).

8. The device as claimed in claim 7, wherein at least the groove wall (30, 31) facing towards the welding area (9) has an outside diameter which is only slightly smaller than the clearance diameter of the work-piece bore.

9. The device as claimed in claim 1, wherein at least one clamping unit has two clamping member rows at an axial distance from one another.

10. The device as claimed in claim 1, wherein the groove walls next to one another which belong to two successive clamping member rows sit, connected by a bushing (40), on a retaining body (21).

11. The device as claimed in claim 10, Wherein the retaining body (21) forms the groove root of the clamping grooves (36, 39, 42) accommodating the clamping members.

12. The device as claimed in claim 10, wherein the groove walls belonging to the same clamping unit are displaceable together on the retaining body (21).

13. The device as claimed in claim 10, Wherein the groove walls belonging to various clamping units are firmly arranged on the retaining body (21) and the latter —supported on at least one side by a spring (13a, 13b)—is arranged in the path of the drive force.

14. The device as claimed in claim 1, wherein only one drive is provided for both separately actuable clamping units, and all clamping grooves of the two clamping units are connected one after the other with respect to the drive, with a spring (13a, 13b) which counteracts the drive force being provided parallel to the clamping grooves of one of the clamnping units.

15. The device as claimed in claim 1, wherein a coolant circuit (22, 23, 24) is provided for the retaining body (21).

16. The device as claimed in one of claims 1 to 15, wherein inert gas is used as a pressure medium for the drive.

* * * * *